Nov. 24, 1959  C. D. CHRISTIE  2,914,128
DRIVE TO TANDEM AXLE RESPONSIVE TO SPEED
Filed Jan. 14, 1957  4 Sheets-Sheet 1

INVENTOR.
CHESTER D. CHRISTIE
BY
ATTORNEYS

Nov. 24, 1959 — C. D. CHRISTIE — 2,914,128
DRIVE TO TANDEM AXLE RESPONSIVE TO SPEED
Filed Jan. 14, 1957 — 4 Sheets-Sheet 3
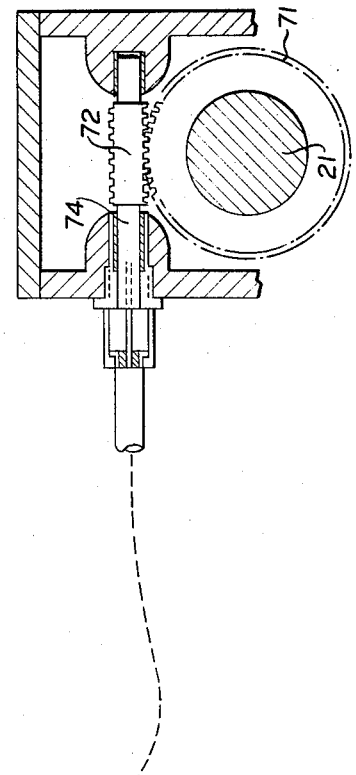
Fig. 3
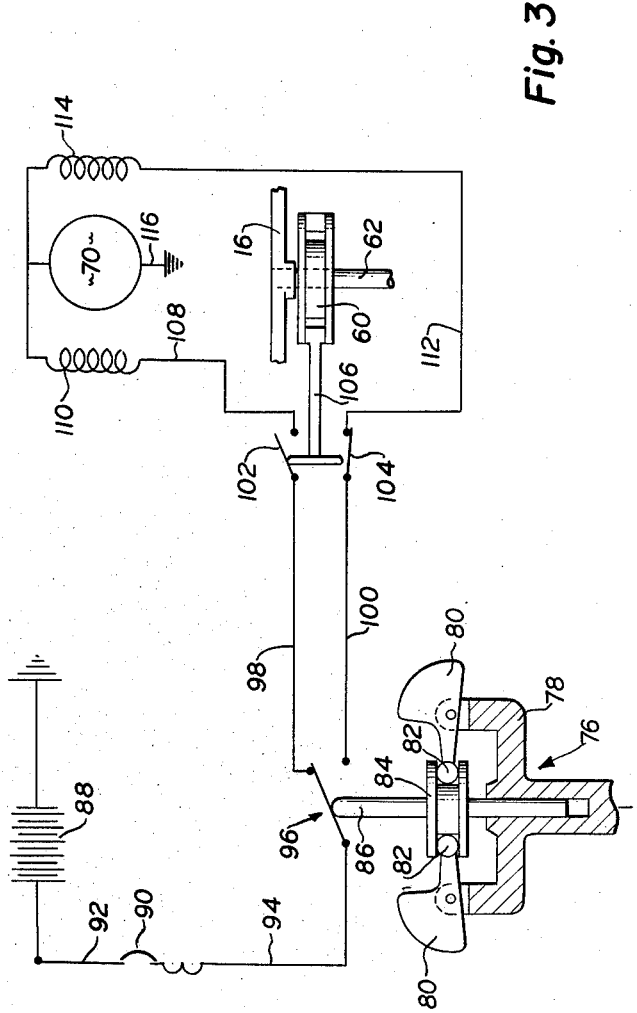
INVENTOR.
CHESTER D. CHRISTIE
BY
ATTORNEYS Nov. 24, 1959 C. D. CHRISTIE 2,914,128
DRIVE TO TANDEM AXLE RESPONSIVE TO SPEED
Filed Jan. 14, 1957 4 Sheets-Sheet 4
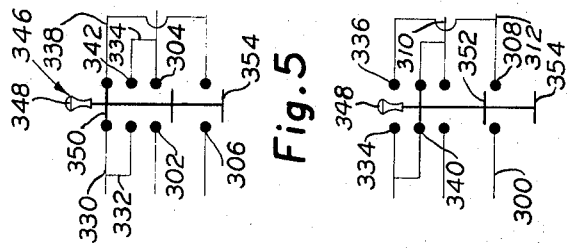
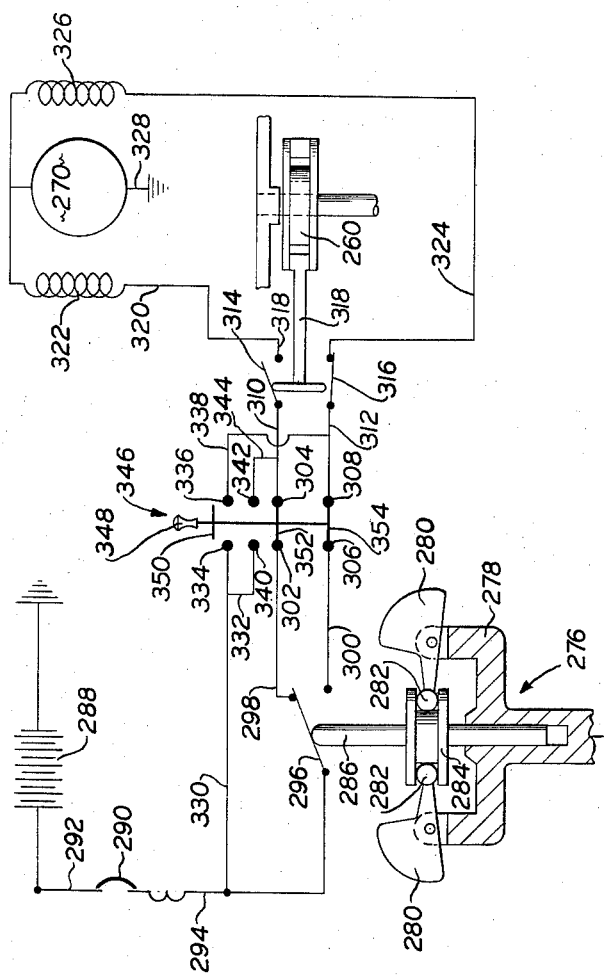
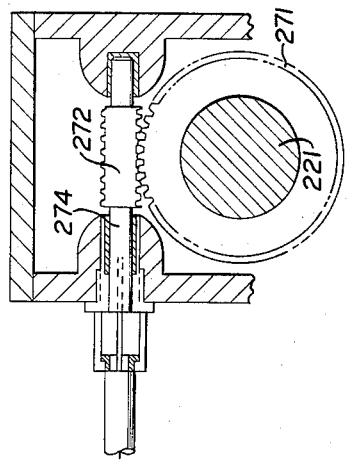
INVENTOR.
CHESTER D. CHRISTIE
BY
ATTORNEYS

United States Patent Office 2,914,128
Patented Nov. 24, 1959

2,914,128

DRIVE TO TANDEM AXLE RESPONSIVE TO SPEED

Chester D. Christie, Shaker Heights, Ohio, assignor to Eaton Manufacturing Company, Cleveland, Ohio, a corporation of Ohio Application January 14, 1957, Serial No. 633,863

7 Claims. (Cl. 180—22)

This device relates to a multiple axle arrangement on a vehicle wherein one axle is driven from the engine propeller shaft and another axle is selectively driven in series relationship by gearing means from said first axle.

These plural axle arrangements are generally provided for two important reasons. First, by providing a multiplicity of axles, the gross vehicle load is distributed between more axles and consequently, reduces the weight load per axle. Secondly, under adverse weather conditions, a tandem axle vehicle which has means to drive both axles gives better traction since the torque from the engine is divided between the axles.

However, under ordinary high speed operating conditions, it is not necessary to have the torque distributed amongst several axles. Actually, such an arrangement has disadvantages under certain road speed conditions. For example, if an inter axle differential arrangement is utilized, the unsprung weight of the vehicle is greatly increased as well as an increase in initial cost. If a series arrangement is used under all operating conditions with no differential means, excessive tire wear is encountered.

Still others have disclosed a series driving relationship of two axles wherein the selective connection of the second axle is controlled by a particular speed ratio in the vehicle transmission. For example, one device discloses a series related structure wherein the second axle becomes a trailing or dead axle when the vehicle transmission is shifted into high gear. The disadvantages of such an arrangement are obvious since the necessity for dividing the torque to a plurality of axles is a condition governed by vehicle speed and road friction conditions rather than the transmission speed ratio.

It is an object of this invention to provide a device which utilizes the advantages of a single axle drive as well as a tandem axle drive.

Another object of this invention is to provide a tandem axle arrangement wherein both axles are driven with a considerable decrease in cost and of unsprung weight as compared to conventional structures.

Still another object is to provide a tandem axle arrangement wherein one axle is driven at all times by the engine and the second axle is driven only under certain operating conditions.

These and other objects and advantages will become more apparent from the following detailed description of the device and from the accompanying drawings wherein:

Figure 1 is a schematic illustration of the instant invention in a tandem axle vehicle.

Figure 1a discloses a tandem axle arrangement utilizing the present invention.

Figure 3 illustrates a control means for the disclosed invention.

Figure 4 illustrates a modification of the structure disclosed in Figure 3.

Figure 5 illustrates the switch structure shown in Figure 4 in another control position.

Figure 6 illustrates the switch structure shown in Figure 4 in still another control position.

Briefly, this invention relates to a tandem axle arrangement wherein one of the axles is driven at all times by the vehicle propeller shaft. The second axle is selectively connected in series relationship with the first axle so that when the axles are so connected, each axle is driven at the same speed ratio by the engine. A clutch means is provided between the first and second axle drive means which automatically disengages above a predetermined speed so that only one of the axles is driven by the engine when a predetermined speed is reached. When the axle input driving means falls below the predetermined speed, the clutch automatically engages and provides positive two axle drive.

A modification embodies similarly the same structure, and in addition, a manually operable overcontrol means which provides in one position for the drive of both axles by the engine at any vehicle speed and in another position, provides for disengagement of the drive to the second axle at any vehicle speed.

Figure 1:
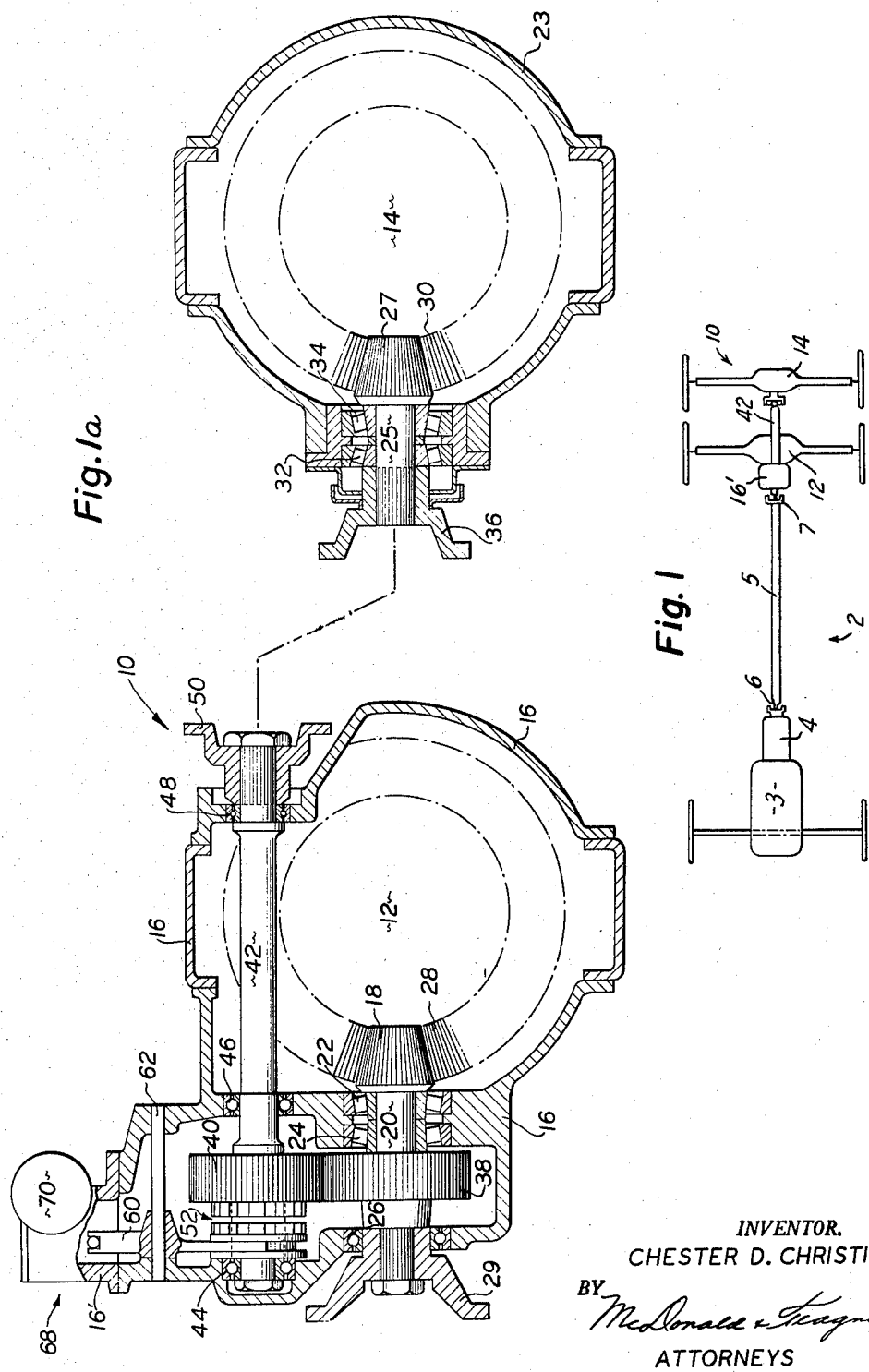

Referring to the drawing for a more detailed description of the mechanism, Figure 1 discloses a vehicle 2 having an engine 3 drivingly connected to a change speed transmission 4. A propeller shaft 5 is connected to the output portion 6 of transmission 4 and is also drivingly connected to the input 7 of an axle 12 of a tandem axle arrangement 10. Propeller shaft 5, transmission output portion 6 and the input portion of axle 12 comprise a torque transfer assembly and a portion of this assembly is utilized in a speed responsive sense to render axle 14 either a live or a dead axle in a manner to be hereinafter more fully described. The axle 12 is comprised of a casing 16 which rotatably supports the axle shafts (not shown) and a pinion 18 having a shaft portion 20 supported in bearings 22, 24, and 26. The pinion 18 meshes with a bevel ring gear 28 which is also supported in the casing 16. This portion of the axle structure is conventional and forms no part of the present invention. A universal joint companion flange 29 is fixed to the shaft 20 and is adapted to be driven by a vehicle propeller shaft 21 (shown in Figure 3) of the vehicle (not shown) through a rear universal joint (not shown).

Similarly, the axle 14 is comprised of a casing 23 which rotatably supports pinion shaft 25 and a pinion 27 which meshes with a bevel ring gear 30. Bearings 32 and 34 are provided in the housing 23 to support the shaft 25 and a universal joint companion flange 36 is splined to the shaft 25 and is adapted to be driven by a gear train which is described below.

The pinion shaft 20 of the axle 12 has a gear 38 fixed for rotation therewith and meshes with a gear 40 which is journalled on a shaft 42 and is free to rotate relative thereto. A plurality of bearings 44, 46, and 48 support shaft 42. A universal joint companion flange 50 is splined to the shaft 42 and is drivingly connected by propeller shaft means to the companion flange 36 of the axle 14.

It is to be noted that no idler gear is shown between gears 38 and 40 to enable shaft 42 to rotate in the same direction as pinion shaft 20. These shafts obviously must rotate in the same direction since they are connected to ground engaging wheels which must rotate in the same direction.

A selectively engageable clutch means 52 is supported in housing portion 16' and is comprised of an annular row of teeth 54 formed on a side face of gear 40 and are adapted to be meshingly engaged with an annular row of teeth 56 which are formed on the side face of a shiftable sleeve 58 which is splined at 59 for rotation with the shaft 42. A shifting lever 60 is slideably mounted on a shaft 62 which is supported in the housing 16 and is provided with a yoke 64 which is receivable in an annular recess 66 formed in the shiftable sleeve 58. A conventional shifting means 68 comprised of a reversible electric motor 70 is adapted to reciprocate the shifting lever 60 along shaft 62 whenever it is desired to effect either engagement or disengagement of the clutch 52. This shifting means is of the conventional preselection type disclosed in U.S. Patent No. 2,462,779, granted Feb. 22, 1949, and hence is not shown in detail in the drawing but sufficient structure is set forth for the purposes of this disclosure.

Figure 3 shows the control for the invention wherein the propeller shaft 21 is adapted by way of a gear 71 secured thereto, to drive a worm gear 72 rotatably connected to a shaft 74 which drives a fly ball assembly 76 which is comprised of a rotating portion 78 and a plurality of pivoted weights 80 rotatable therewith. The weights 80 have projecting spherical portions 82 which are received in a collar 84 longitudinally fixed to a shaft 86. The electric control circuit is comprised of a source of electrical energy 88 connected to a circuit breaker 90 by a conductor 92. Conductor 94 is connected to an input terminal of a switch 96 which is adapted to connect conductor 94 to either conductor 98 or 100, depending upon the position of the fly ball assembly. Conductors 98 and 100, respectively, are connected to a pair of limit switches 102 and 104 which are adapted to be selectively opened by a control arm 106 which forms a portion of the shifting lever 60. A conductor 108 connects a terminal of switch 102 to a field winding 110 of the motor 70 and a conductor 112 connects a terminal of switch 104 to a field winding 114 of motor 70. A conductor 116 connects the motor to ground.

Figure 2:
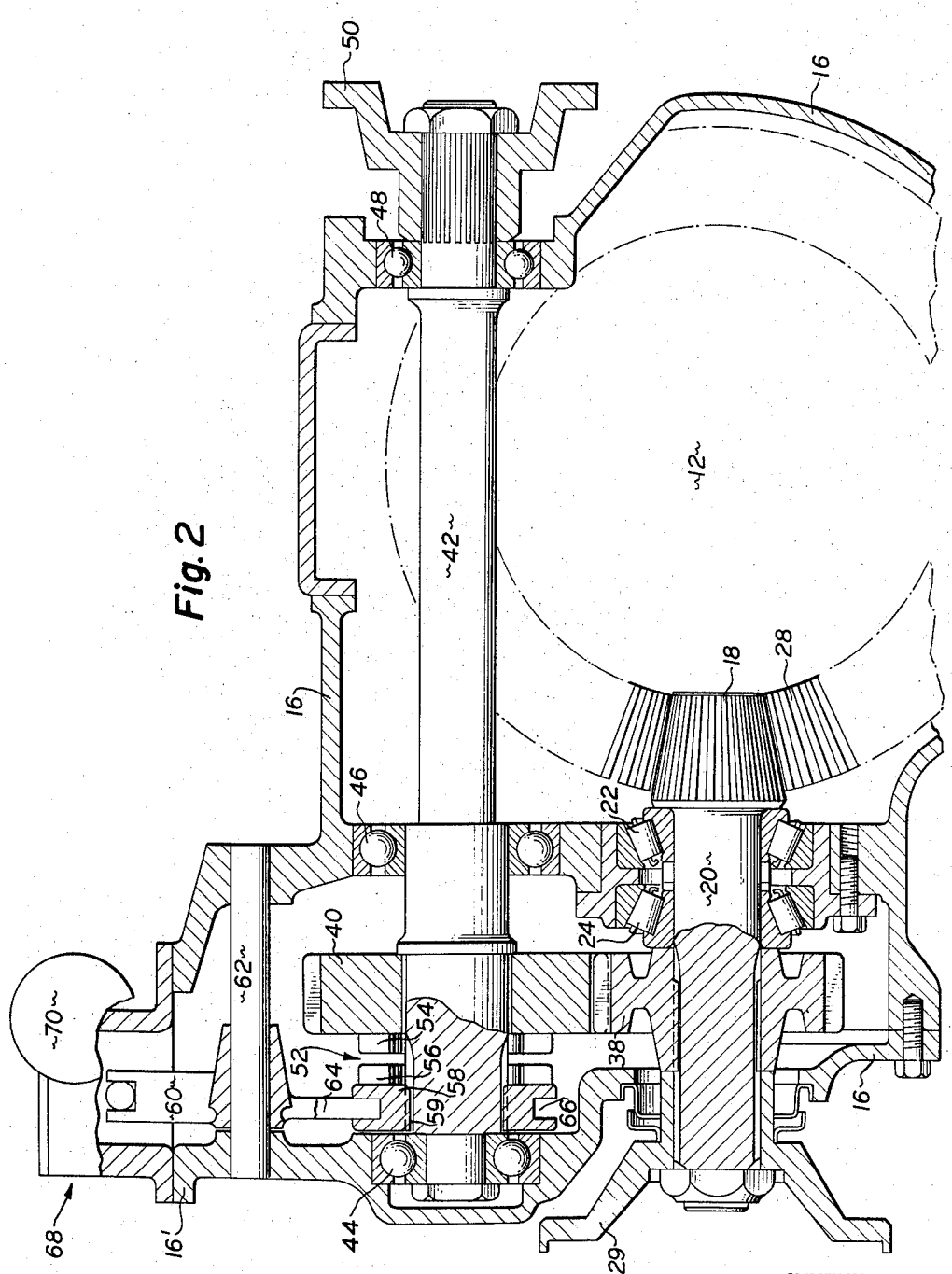
Figure 2 is an enlarged view of a portion of the structure shown in Figure 1.

In order to more clearly understand this device, a typical operating cycle is set forth as follows: When the vehicle is in a starting position, fly ball governor 76 is in a position such that conductor 94 is connected through switch 96 to conductor 100. During this condition, clutch 52 is engaged and consequently, both of the axles are drivingly connected to the vehicle propeller shaft. When the axle input driving means is accelerated to a predetermined speed, fly ball governor 76 is rotated with sufficient angular velocity to move pivoted weights 80 to the position shown in Figure 3 and switch 96 is moved to connect conductor 94 to conductor 98. Under this operating condition, current is fed through conductors 92, 94, 98, and 108 to field winding 110 which rotates motor 70 in one direction of rotation. When the motor is rotated in this direction, shifting means 68 is preselected to a position wherein shifting lever 60 is resiliently biased in a clutch disengaging direction. The clutch is resiliently biased by a structure similar to that shown in previously referred to U.S. Patent #2,462,779. When the vehicle operator releases the driving torque to the rear axles, the resiliently biased shifting lever 60 is then free to move to the left as viewed in Figure 2, because of the removal of the driving load from the clutch teeth, which results in disengagement of clutch teeth 54 and 56. As shifting lever 60 is moved, control arm 106 is also moved so that when the clutch teeth are completely disengaged, switch 102 is opened by control arm 106 which breaks the energizing circuit. This completes the disengaging cycle of the axle 14 from the vehicle propeller shaft.

If the axle input driving means' speed falls below the aforementioned predetermined speed, fly ball governor 76 also decreases in angular velocity until the pivoted weights 80 move the shaft 86 to a position wherein conductor 94 is connected to conductor 100. At this time, current is fed through conductors 92, 94, 100, and 112 to the field winding 114. Energization of field winding 114 results in rotation of the motor in the opposite direction which resiliently biases the shifting lever 60 to the right, as viewed in Figure 2. Since the clutch teeth are disengaged, shifting lever 60 immediately moves in a clutch engaging direction resulting in engaging of clutch teeth 54 and 56. Completion of movement of shifting lever 60 in a clutch engaging direction results in the opening of switch 104 by control arm 106 which deenergizes the motor actuating circuit. The appropriate cycle is repeated whenever there is a transition of axle input driving means' speed, either above or below the aforementioned predetermined speed.

Figure 4 illustrates a modification of the invention wherein a manually operable switch means is provided to over-control the governor means so that in one position of the switch means, both axles are driving axles regardless of the vehicle speed, and in another position of the manually operable switch means, the second axle is a dead or trailing axle regardless of the vehicle speed.

The propeller shaft 221 is adapted by way of a gear 271 secured thereto, to drive a worm gear 272 rotatably connected to a shaft 274 which drives a fly ball governor assembly 276 comprised of a rotating portion 278 and a plurality of pivoted weights 280 rotatable therewith. The weights 280 have projecting spherical portions 282 which are received in the collar 284 longitudinally fixed to a shaft 286. The electrical control circuit is comprised of a source of electrical energy 288 connected to a circuit breaker 290 by a conductor 292. Conductor 294 is connected to an input terminal of switch 296 which is adapted to connect conductor 294 to either conductor 298 or 300, depending upon the position of the fly ball assembly. Conductors 298 and 300, respectively, are connected to terminals 302, 306, respectively; terminals 304 and 308 are connected to conductors 310 and 312, respectively, and these terminals are in turn connected to a pair of limit switches 314 and 316 which are adapted to be selectively opened by a control arm 318 which forms a portion of a shifting lever 260. A conductor 320 connects a terminal of switch 314 to a field winding 322 of a motor 270 and a conductor 324 connects a terminal of switch 316 to a field winding 326 of motor 270. A conductor 328 connects the motor to ground.

A conductor 330 is connected to conductor 294 and a conductor 332 is connected parallel with conductor 330. A pair of spaced terminals 334 and 336 are arranged to selectively connect conductor 330 and a conductor 338 and a pair of spaced terminals 340 and 342 are arranged to selectively connect conductor 332 and a conductor 344. Conductor 338 is connected to conductor 312 and conductor 344 is connected to conductor 310. Terminals 334, 336, 340, 342, 302, 304, 306, and 308 form a part of a manually operable switch 346. A movable member 348 having a plurality of spaced switch blades 350, 352, and 354 completes the switch structure.

When the movable member 348 is in the position shown in Figure 4, the operation of the device is the same as that disclosed in Figure 3.

If the movable member 348 is moved to a position wherein switch blade 350 bridges spaced terminals 334 and 336, as illustrated in Figure 5, and the remainder of the terminals of switch 346 are open, the governor 276 is therefore bypassed and, regardless of the position of the governor, motor 270 is energized in a clutch engaging direction which results in both axles being driven by the vehicle engine.

If the movable member 348 of switch 346 is moved to a position wherein switch blade 350 bridges terminals 340 and 342, and the remaining terminals of switch 346 are open, as viewed in Figure 6, the governor is again bypassed and the motor 270 is energized in a clutch disengaging direction, regardless of the position of the governor. Therefore, when switch 346 is in this position, the second axle is a dead or trailing axle at all vehicle speeds.

It is to be understood that the basic novelty in this invention is the idea of providing a fully automatic control for the selective engagement of a second axle in a tandem axle arrangement. However, in some applications, it might be desirable to have the above-described manual over-control means.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

I claim:

1. In a vehicle, a first axle, means to drive said first axle, a second axle, means to drive said second axle, means to selectively engage said second axle driving means with said first axle driving means, speed responsive means to control the said last mentioned means, and manually operable means to over-control said speed responsive means.

2. In a vehicle, a pair of axles, a propeller shaft drivingly connected to one of said axles, driving means driven by said propeller shaft, means to drive the other of said axles, speed responsive means to control the engagement of said driving means driven by said propeller shaft with said driving means for said other of said axles, and manual means to over-control said speed responsive means whereby both of said axles are driven simultaneously by said propeller shaft.

3. In a vehicle, a pair of axles, a propeller shaft drivingly connected to one of said axles, driving means driven by said propeller shaft, means to drive the other of said axles, speed responsive means to control the engagement of said driving means driven by said propeller shaft with said means to drive said other of said axles, and manual means to overcontrol said speed responsive means whereby engagement is prevented between said driving means driven by said propeller shaft and said driving means to drive said other of said axles.

4. In a vehicle, a pair of axles, a propeller shaft drivingly connected to one of said axles, driving means driven by said propeller shaft, means to drive the other of said axles, speed responsive means to control the engagement between said driving means driven by said propeller shaft and said means to drive said other of said axles, and multi-positionable manual means having a first position whereby said speed responsive means is rendered operative to control the selective engagement of said axles, another position whereby both of said axles are driven simultaneously by said propeller shaft, and a further position whereby said other of said axles is rendered inoperative as a driving axle.

5. In a tandem axle vehicle, change speed gear means, a first axle, a torque transfer assembly connecting said change speed gear means and said first axle for conjoint rotation, a second axle, means selectively rotatably connecting said second axle with said torque transfer assembly, and speed responsive means operatively connected to and actuated by the speed of said torque transfer assembly and operatively connected to said second axle connecting means to effect driving engagement of said torque transfer assembly and said second axle below a predetermined speed of said torque transfer assembly and to effect disengagement of said second axle from said torque transfer assembly above a predetermined speed of said torque transfer assembly.

6. In a tandem axle vehicle, an engine, change speed gear means driven by said engine, a first axle, a second axle, torque transmitting means connecting said change speed gear means and said first axle, selectively engageable clutch means drivingly connecting said first axle and said second axle, speed responsive means operably connected to and actuated by the speed of said torque transmitting means, and means operatively connecting said speed responsive means and said clutch means whereby said second axle is drivingly connected to said first axle through said clutch means below a predetermined speed of said speed responsive means and disconnected therefrom above a predetermined speed.

7. In a tandem axle vehicle driving arrangement, an engine, change speed transmission means driven by said engine, a first axle, a torque transfer assembly comprising an output member of said transmission, a first axle input member and a torque transmitting means connecting said transmission output member and said axle input member, a second axle, engageable means selectively operable to drivingly connect said torque transfer assembly and said second axle, control means operatively connected to said engageable means, and said control means being connected to and driven by a part of said torque transfer assembly and responsive to the speed thereof to disengage said engageable means above a predetermined speed of said control means.

References Cited in the file of this patent

UNITED STATES PATENTS

| | | |
|---|---|---|
| 2,419,807 | Wilcox | Apr. 29, 1947 |
| 2,537,400 | Drong | Jan. 9, 1951 |
| 2,699,852 | Cost | Jan. 18, 1955 |
| 2,711,222 | Bock | June 21, 1955 |

FOREIGN PATENTS

| | | |
|---|---|---|
| 154,313 | Austria | Sept. 26, 1938 |